(12) United States Patent
Barroux et al.

(10) Patent No.: US 10,397,582 B2
(45) Date of Patent: Aug. 27, 2019

(54) IMAGE ENCODING DEVICE AND IMAGE ENCODING METHOD

(71) Applicant: FUJITSU LIMITED, Kawasaki-shi, Kanagawa (JP)

(72) Inventors: Guillaume Denis Christian Barroux, Kawasaki (JP); Kimihiko Kazui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 15/291,182

(22) Filed: Oct. 12, 2016

(65) Prior Publication Data

US 2017/0150153 A1 May 25, 2017

(30) Foreign Application Priority Data

Nov. 24, 2015 (JP) .................................. 2015-228419

(51) Int. Cl.
*H04N 19/147* (2014.01)
*H04N 19/115* (2014.01)
(Continued)

(52) U.S. Cl.
CPC ......... *H04N 19/147* (2014.11); *H04N 19/105* (2014.11); *H04N 19/115* (2014.11);
(Continued)

(58) Field of Classification Search
CPC .... H04N 19/147; H04N 19/90; H04N 19/182; H04N 19/105; H04N 19/115; H04N 19/186; H04N 19/88
See application file for complete search history.

(56) References Cited

U.S. PATENT DOCUMENTS 5,990,864 A * 11/1999 DeAguiar ............. G06T 11/001
                                                              345/600
6,522,783 B1 * 2/2003 Zeng ..................... H04N 1/644
                                                              341/107
(Continued)

FOREIGN PATENT DOCUMENTS

JP      04-061558       2/1992
JP      4-367192        12/1992
(Continued)

OTHER PUBLICATIONS

Rajan Joshi et al., "High Efficiency Video Coding (HEVC) Screen Content Coding: Draft 12", Joint Collaborative Team on Video Coding (JCT-VC) of ITU-T SG 16 WP 3 and ISO/IEC JTC 1/SC 29/WG 11, Document JCTVC-SR1005-v23, 18th Meeting: Sapporo, JP, Jun. 30-Jul. 9, 2014 (374 pages).
(Continued)

*Primary Examiner* — Joseph Suh
(74) *Attorney, Agent, or Firm* — Fujitsu Patent Center

(57) ABSTRACT

An association circuit determines whether a first pixel in an image will be associated with an entry in a palette, based on a threshold for a difference between a pixel value and a palette value. An addition circuit adds an entry to the palette when the first pixel is not associated with an entry. A fusion circuit fuses two entries so as to generate a fused entry when a condition of a target amount of information is not satisfied by adding an entry. A control circuit changes the threshold when the first pixel is associated with an entry, when an entry is added, or when the fused entry is generated and an entry is added. The association circuit determines whether a second pixel in the image will be associated with an entry, based on the changed threshold. A palette encoding circuit encodes the image by using the palette.

9 Claims, 15 Drawing Sheets

RELATED ART

(51) Int. Cl.
*H04N 19/186* (2014.01)
*H04N 19/88* (2014.01)
*H04N 19/105* (2014.01)
*H04N 19/182* (2014.01)
*H04N 19/90* (2014.01)

(52) U.S. Cl.
CPC ......... *H04N 19/182* (2014.11); *H04N 19/186* (2014.11); *H04N 19/88* (2014.11); *H04N 19/90* (2014.11)

(56) References Cited

U.S. PATENT DOCUMENTS

| | | | |
|---|---|---|---|
| 6,618,500 B1* | 9/2003 | Dawson | G06T 11/001 345/604 |
| 2004/0258300 A1* | 12/2004 | Proteau | G06T 3/40 382/162 |
| 2005/0122427 A1* | 6/2005 | Hougui | H04N 7/122 348/453 |
| 2005/0169522 A1* | 8/2005 | Schoner | G09G 5/02 382/167 |
| 2011/0099343 A1* | 4/2011 | Ozdemir | G06F 11/2082 711/162 |
| 2014/0064612 A1* | 3/2014 | Matsumura | G06T 9/00 382/166 |
| 2015/0016501 A1* | 1/2015 | Guo | G06T 9/00 375/240.02 |
| 2015/0281703 A1* | 10/2015 | Zou | H04N 19/94 375/240.24 |
| 2015/0365695 A1* | 12/2015 | Pu | H04N 19/176 375/240.16 |
| 2016/0316214 A1* | 10/2016 | Gisquet | G09G 5/06 |
| 2016/0330452 A1* | 11/2016 | Laroche | H04N 19/13 |
| 2017/0142426 A1* | 5/2017 | Kempf | H04N 1/644 |
| 2017/0310977 A1* | 10/2017 | Laroche | H04N 19/70 |
| 2018/0192049 A1* | 7/2018 | Fu | H04N 19/146 |

FOREIGN PATENT DOCUMENTS

| | | |
|---|---|---|
| JP | 2001-211081 | 8/2001 |
| JP | 2004-229100 | 8/2004 |
| JP | 2007-312152 | 11/2007 |
| JP | 2008-311792 | 12/2008 |
| JP | 2010-157899 | 7/2010 |
| JP | 2014-53654 | 3/2014 |
| WO | 2015/148814 A1 | 10/2015 |

OTHER PUBLICATIONS

JPOA—Japanese Office Action dated May 14, 2019 for corresponding Japanese Application No. 2015-228419 with full machine translation. **US 2014/00646612 corresponding to JP2014-53654 on Form 892 dated Aug. 31, 2018.

* cited by examiner

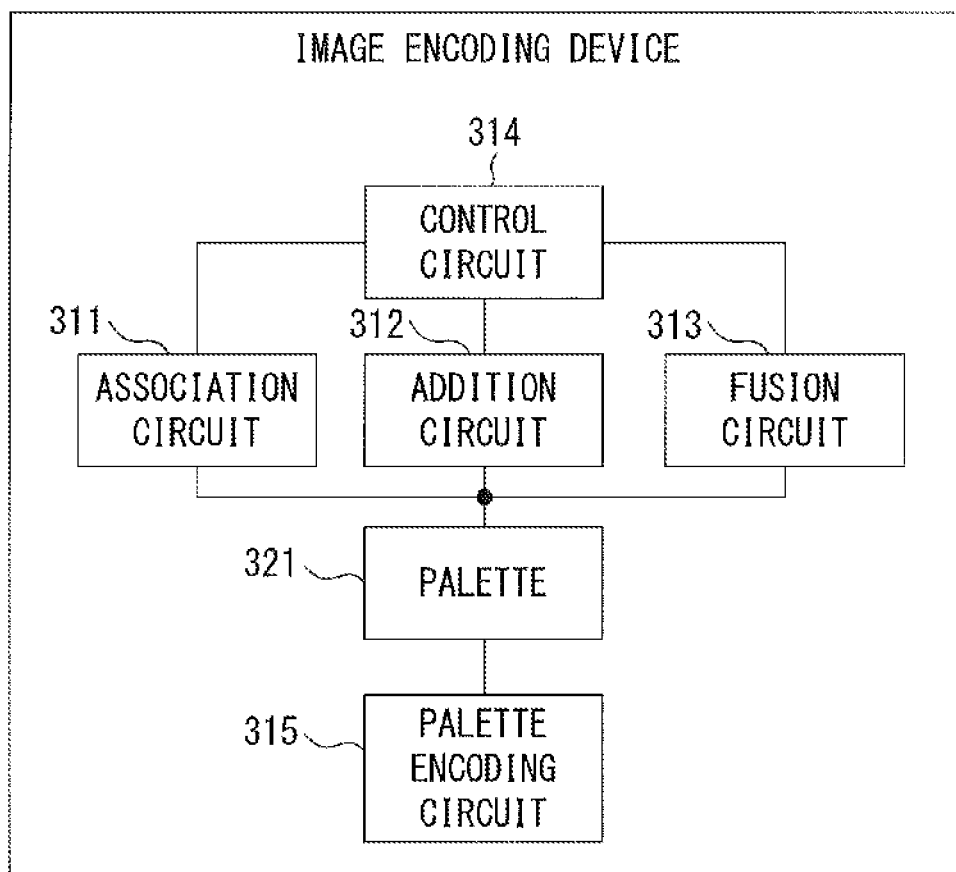
F I G. 3

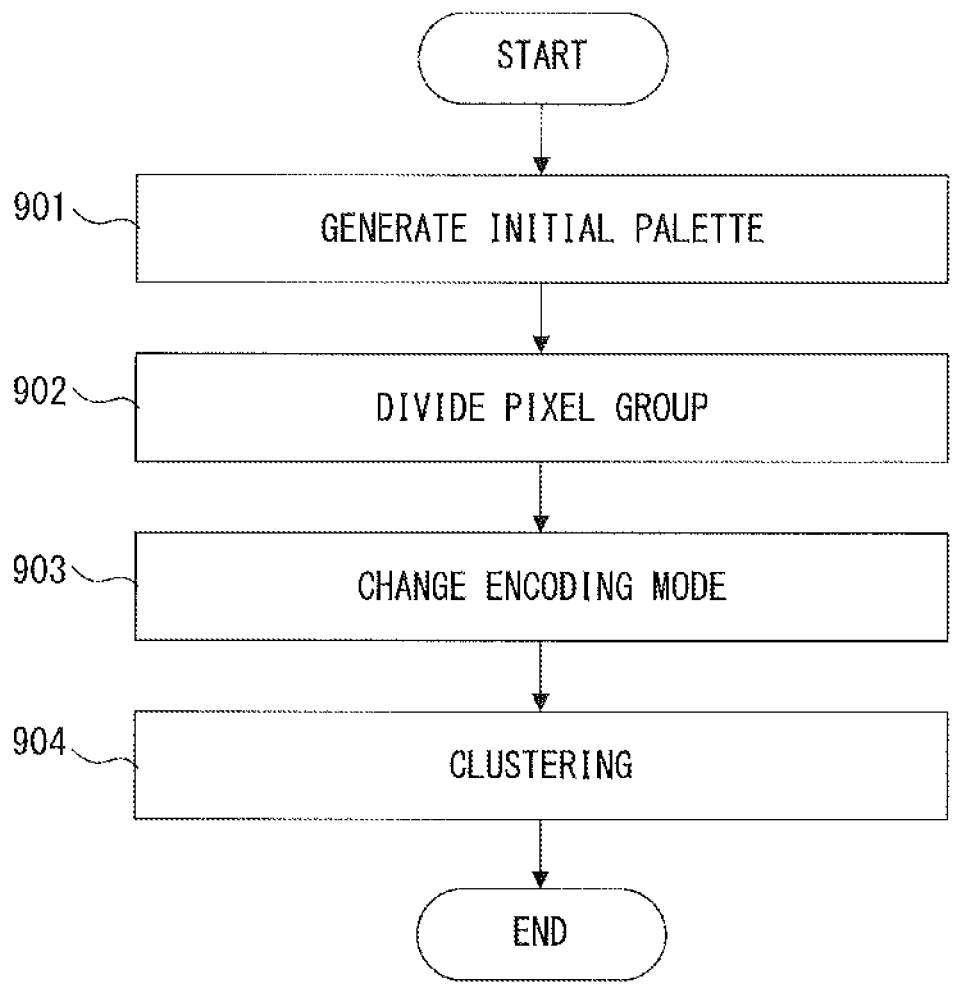
F I G. 9

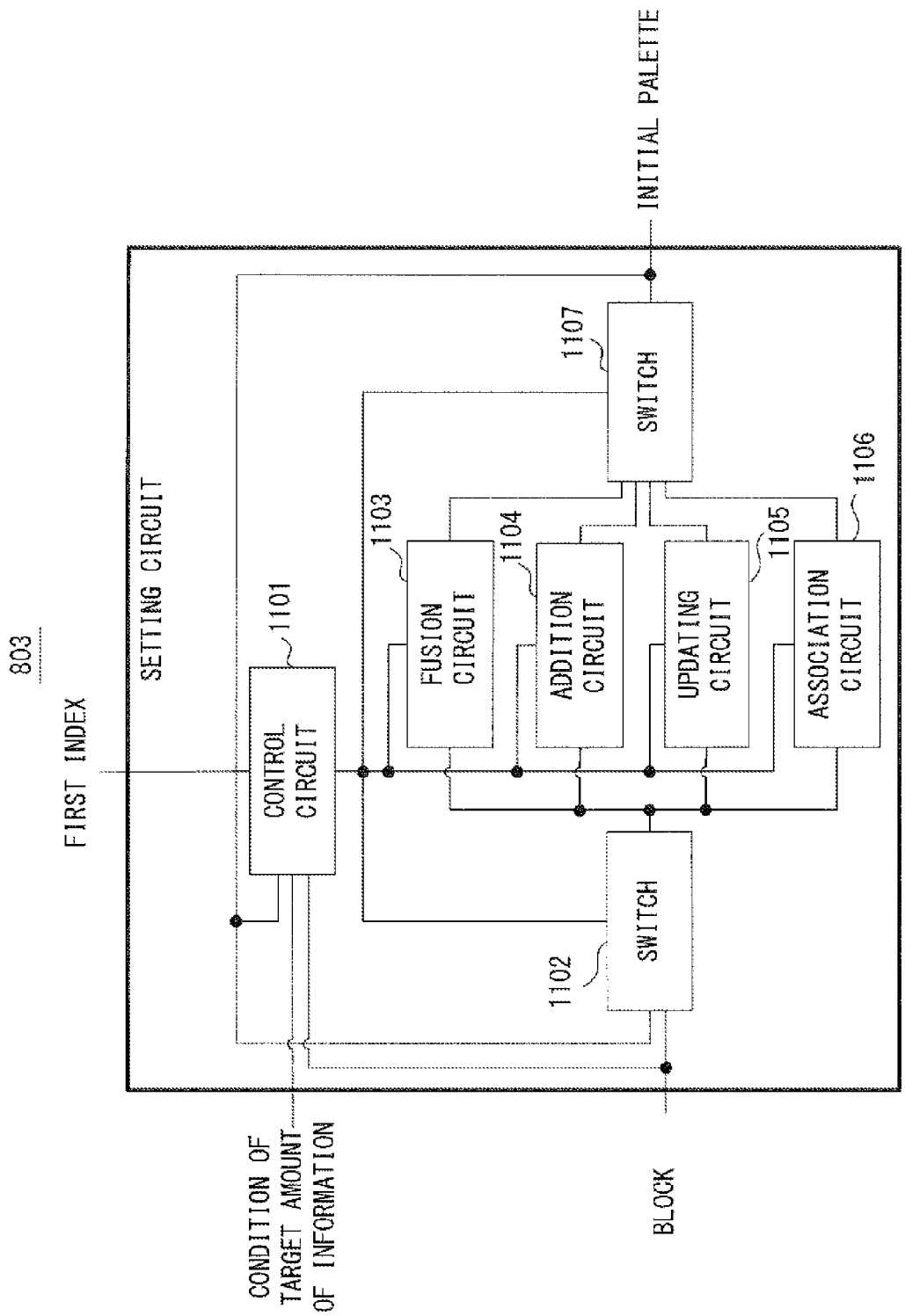
F I G. 11

IMAGE ENCODING DEVICE AND IMAGE ENCODING METHOD

CROSS-REFERENCE TO RELATED APPLICATION

This application is based upon and claims the benefit of priority of the prior Japanese Patent Application No. 2015-228419, filed on Nov. 24, 2015, the entire contents of which are incorporated herein by reference.

FIELD

The embodiments discussed herein are related to an image encoding device and an image encoding method.

BACKGROUND

As international standardization in moving image encoding in recent years, Moving Picture Experts Group (MPEG) of International Organization for Standardization/International Electrotechnical Commission (ISO/IEC) is known. MPEG corresponds to ISO/IEC JCT1/SC29/WG11, and the international standardization thereof includes a technology for encoding screen content video. The screen content video is video generated by computer graphics or the like, and pixel values of the screen content video often have a high redundancy.

As a technology for promoting encoding of the screen content video above, palette encoding is known. In palette encoding, several indices are associated with pixel values of pixels in one block, and the pixel values are encoded by transmitting the indices instead of the pixel values. The number of bits of the index is smaller than the number of bits of the pixel value. Therefore, compression efficiency of the entirety of video is improved by transmitting the indices instead of the pixel values.

FIG. 1 illustrates an example of palette encoding. An image 101 includes 64 (8×8) pixels, and a palette 103 is generated from respective pixel values of the image 101. Each entry in the palette 103 corresponds to color included in the image 101, and includes an index and a palette value. The index is a code indicating color, and the palette value is a pixel value indicating color. In this example, (R, G, B) is used as the pixel value. The palette 103 is also referred to as a palette table.

An index map 102 is generated by replacing respective pixel values of the image 101 with the indices by using the palette 103. An encoding result of the image 101 is generated by encoding the index map 102 and the palette 103.

Respective values of R, G, and B are expressed by 8 bits, and therefore an amount of information per pixel of the image 101 is 24 (8×3) bits, and an amount of information of the entirety of the image 101 is 1536 (24×64) bits.

Meanwhile, each of the indices is expressed by 3 bits, and therefore an amount of information of the index map 102 is 192 (3×64) bits. In addition, the palette value is expressed by 24 bits, and therefore an amount of information of the palette values included in the palette 103 is 120 (24×5) bits. Accordingly, an amount of information of the index map 102 and the palette 103 is 312 (192+120) bits, and is reduced to about ⅕ the amount of information of the image 101.

Screen content encoding of High Efficiency Video Coding (HEVC) supports both lossy encoding and lossless encoding. Lossless encoding is encoding in which a decoding result of an encoded image completely matches an original image to be encoded, and lossy encoding is encoding that allows a decoding result to be distorted, compared with an image to be encoded.

An object of lossy encoding is to achieve an optimum ratio of distortion to a bit rate, or to minimize distortion under the restriction of the bit rate. A high bit rate used in lossless encoding is not available in all situations.

Meanwhile, in palette encoding, respective pixel values can be encoded in any of the following modes.

(1) Escape Mode

A pixel value is directly encoded without mapping a pixel value on an index map, and an escape code is generated. In the case of lossy encoding, a pixel value is quantized and encoded in order to reduce the number of bits.

(2) Index Mode

In encoding, a pixel value is replaced with an index, and in decoding, a pixel value that corresponds to an index is extracted from a palette, and the index is replaced with the extracted pixel value. In the case of lossy encoding, a pixel value indicated by an index may be different from an original pixel value before encoding.

Assume that, within a block to be encoded, a pixel value is specified by nb_cc color components, and that the respective color components are expressed by ndepth bits. When arithmetic encoding is not performed after palette encoding, the number of bits nb_bit_esc to transmit one escape code is expressed by using a quantizing value Q according to the following expression.

$$\text{nb\_bit\_esc} = nb\_cc * \ln_2(2^{ndepth}/Q) \quad (1)$$

In this case, the number of bits nb_bit_pal to transmit one palette value in a palette is expressed according to the following expression.

$$\text{nb\_bit\_pal} = nb\_cc * \text{ndepth} \quad (2)$$

When a block to be encoded is encoded by using nb_index different indices, the number of bits nb_bit_ind to transmit one index is expressed according to the following expression.

$$\text{nb\_bit\_ind} = \ln_2(nb\_\text{index}) \quad (3)$$

Distortion of a decoding result can be reduced more efficiently by adding an entry to a palette than by using an escape code. However, as is apparent from expressions (1) to (3), a larger number of bits are generated by adding an entry in a palette than by using an escape code.

In a method for generating a palette by focusing on approximating an image, a range of pixel values in which it is considered appropriate to reference a plurality of pixel values by using the same index is specified first. This range can be derived from a quantizing coefficient QP that has been associated with a block to be encoded. Then, pixels within the block to be encoded are scanned, and when pixel values of a plurality of pixels belong to the same pixel-value range in which the pixel values of the plurality of pixels are referenced by using a unique index, the pixels are grouped. Only when a pixel value of the scanned pixel does not belong to a pixel-value range of any of the entries in the palette, a new entry is generated in the palette.

FIG. 2 illustrates an example of a palette generation method. A histogram 201 illustrates an appearance frequency of each of the pixel values within a block to be encoded. In this example, one-dimensional pixel value is used for simplification.

When one pixel at a time is selected from a block to be encoded, and a pixel value of the selected pixel belongs to a pixel-value range of an existing entry in a palette, the pixel is associated with the existing entry. When the pixel value of the selected pixel does not belong to a pixel-value range of any of the entries, a new entry is generated by using the pixel value of the selected pixel as a palette value. When all of the pixels have been selected, a mean value of pixel values of pixels that have been associated with each of the entries is calculated, and palette values of respective entries are replaced with the calculated mean value such that the entries in the palette are updated only once.

Arrows 211 to 214 respectively indicate updated palette values of entries having the indices "0" to "4". Range [0] to Range [4] respectively indicate updated pixel-value ranges of the entries having the indices "0" to "4".

A technology is also known in which, in image compression that associates pixels having the same color included in an image with the same index, an index of a pixel that is long in distance is separated, or indices of pixels having approximate colors are consolidated (see, for example, Patent Document 1). A technology is also known in which a distribution on a color space of image data is divided into clusters, the divided clusters are repeatedly divided, and pixel data that belongs to each of the clusters is replaced with representative color by using the center of the cluster as the representative color (see, for example, Patent Document 2).

Patent Document 1: Japanese Laid-open Patent Publication No. 2010-157899
Patent Document 2: Japanese Laid-open Patent Publication No. 4-61558

SUMMARY

According to an aspect of the embodiments, an image encoding device includes an association circuit, an addition circuit, a fusion circuit, a control circuit, and a palette encoding circuit, and the image encoding device encodes an image to be encoded by using a palette.

The association circuit determines whether a first pixel included in the image to be encoded will be associated with any entry in the palette, on the basis of a threshold for a difference between a pixel value and a palette value. The addition circuit adds an entry to the palette when the association circuit does not associate the first pixel with any of the entries in the palette. The fusion circuit fuses two entries in the palette so as to generate a fused entry when an encoding result of the image to be encoded does not satisfy a condition of a target amount of information by adding an entry to the palette.

The control circuit changes the threshold when the association circuit associates the first pixel with any of the entries in the palette, when the addition circuit adds the entry to the palette, or when the fusion circuit generates the fused entry and the addition circuit adds the entry to the palette. The association circuit determines whether a second pixel included in the image to be encoded will be associated with any of the entries in the palette, on the basis of the changed threshold. The palette encoding circuit encodes the image to be encoded by using the palette.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram illustrating a first image encoding device;
FIG. 9 is a flowchart of palette generation processing;
FIG. 11 is a block diagram illustrating a setting circuit.

DESCRIPTION OF EMBODIMENTS

Figure 1:
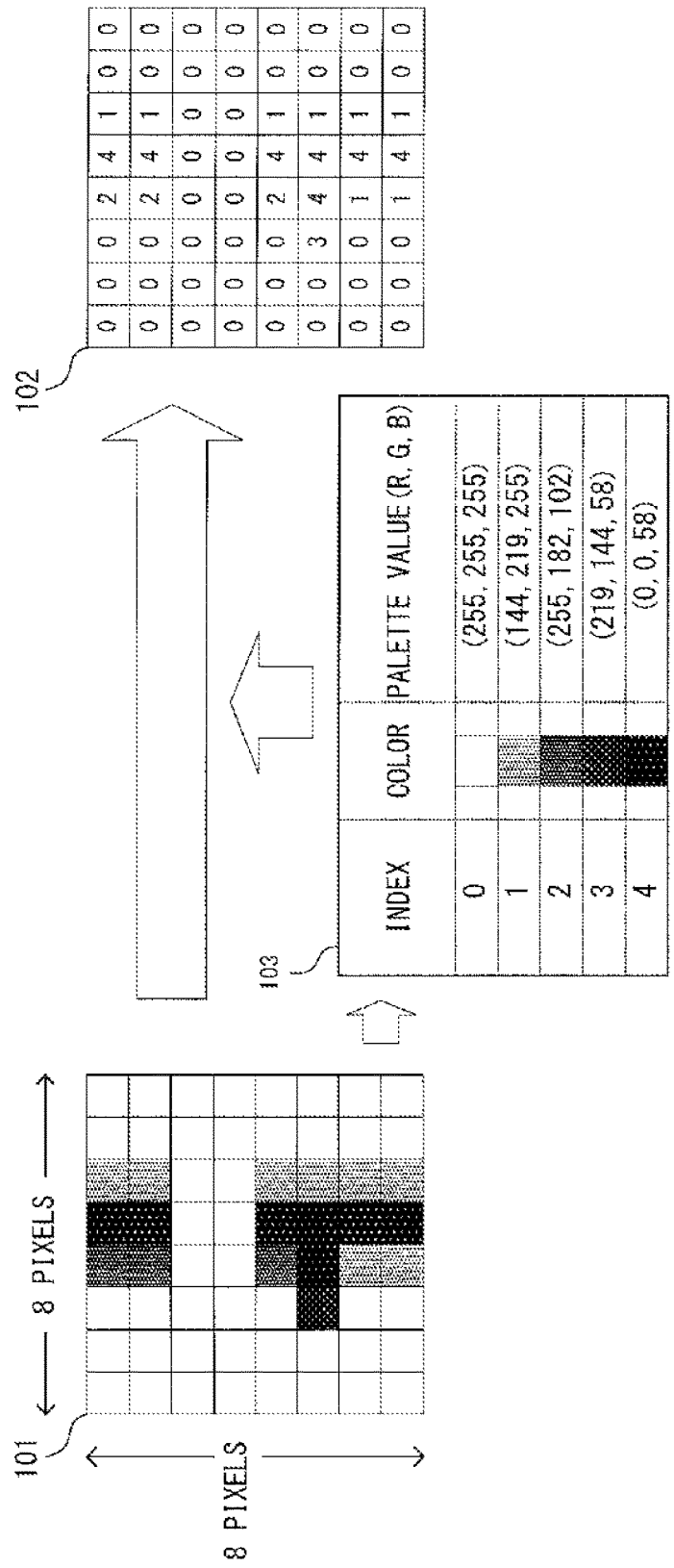
FIG. 1 illustrates palette encoding.

Embodiments are described below in detail with reference to the drawings.

By adopting the technology described in Patent Document 1, when the number of entries in a palette exceeds a prescribed number, a new entry can be added after two existing entries are fused into one entry such that the number of entries is reduced. However, a load of processing for recalculating palette values of entries after fusion and associating respective pixels with the entries after fusion is high, and therefore processing time increases when the number of times of entry fusion increases.

An optimum palette can be generated by performing clustering for classifying pixels and expressing each of the pixels by using an appropriate palette value. As a clustering method, the Linde-Buzo-Gray (LBG) algorithm, K-means clustering, or the like can be employed. These clustering methods are iterative methods for converging on a local optimum solution, and in each iteration, an input point is associated with the closest center of gravity, and the positions of the respective centers of gravity are updated in such a way that the sum of distances between the center of gravity and the associated input points is minimized.

In clustering on a palette, an input point corresponds to a pixel value in a block to be encoded, and the center of gravity corresponds to a palette value. In K-means clustering, only one center of gravity is updated in one iteration, and in the LBG algorithm, all of the centers of gravity are updated in one iteration.

It can be said that these clustering methods are effective to some applications. However, clustering is not a global optimization method. Clustering is highly dependent on an initial state of a clustering result, and it is highly likely to increase processing time. Therefore, it is not realistic to implement an existing clustering method with no change in clustering on a palette.

As described above, in palette encoding, a technology for efficiently generating an optimum palette to reduce distortion of a decoding result under a given bit rate restriction is not known.

The problem above does not occur only when distorting of a decoding result is reduced under a bit rate restriction, but also occurs when other conditions of a target amount of information are given in palette encoding.

FIG. 3 illustrates an exemplary configuration of a first image encoding device according to the embodiments. An image encoding device 301 illustrated in FIG. 3 includes an association circuit 311, an addition circuit 312, a fusion circuit 313, a control circuit 314, and a palette encoding circuit 315, and the image encoding device 301 encodes an image to be encoded by using a palette 321.

Figure 4:
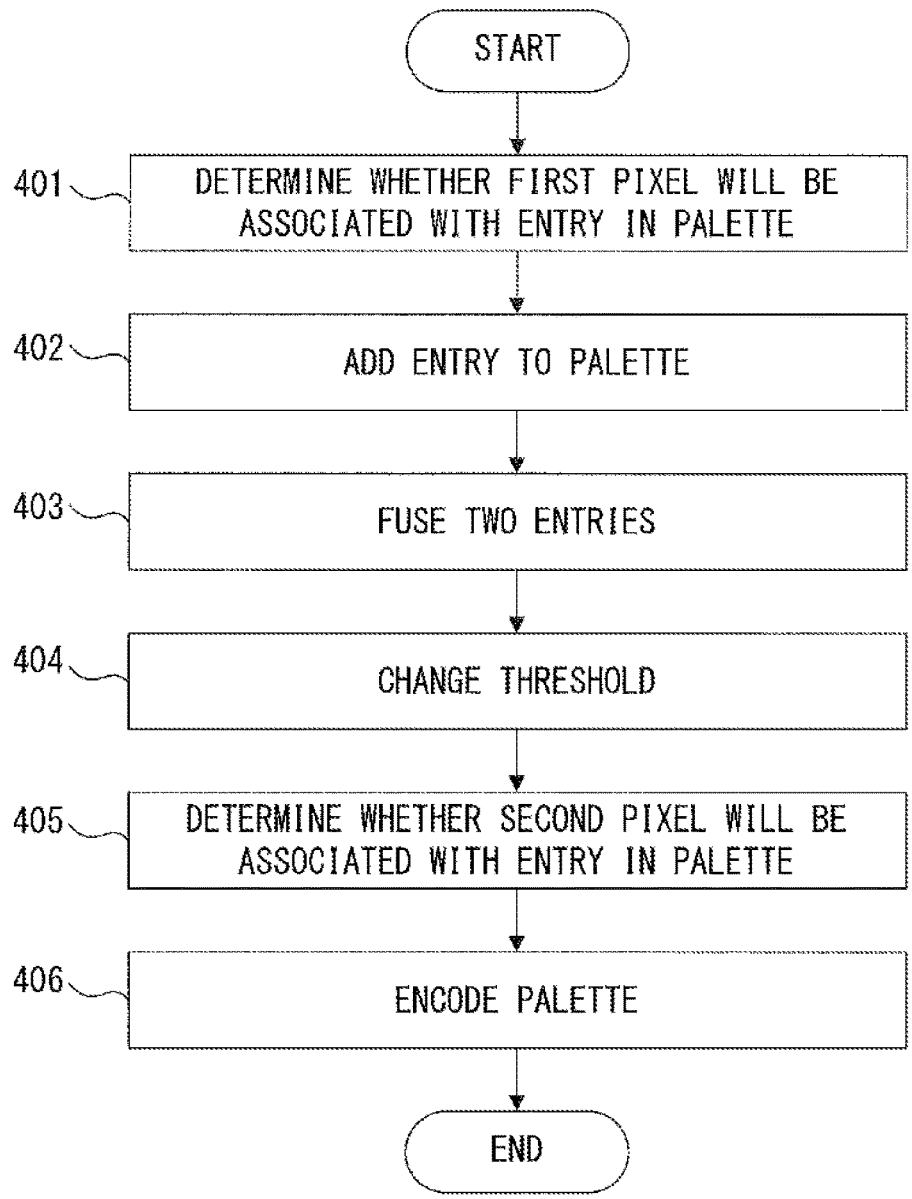
FIG. 4 is a flowchart of first image encoding processing.

FIG. 4 is a flowchart illustrating an example of first image encoding processing performed by the image encoding device 301 of FIG. 3. First, the association circuit 311 determines whether a first pixel included in an image to be encoded will be associated with any of the entries in the palette 321, on the basis of a threshold for a difference between a pixel value and a palette value (step 401). When the pixel value is expressed by a three-dimensional vector, the difference between the pixel value and the palette value can be obtained on the basis of a distance between two three-dimensional vectors. The addition circuit 312 adds an entry to the palette 321 when the association circuit 311 does not associate the first pixel with any of the entries in the palette 321 (step 402).

When an encoding result of the image to be encoded does not satisfy a condition of a target amount of information by adding an entry to the palette 321, the fusion circuit 313 fuses two entries in the palette 321 so as to generate a fused entry (step 403). The addition circuit 312 adds an entry to the palette 321 after the fusion circuit 313 generates the fused entry. The control circuit 314 changes a threshold in any of the following cases (step 404).

(1) A case in which the association circuit 311 associates the first pixel with any of the entries in the palette 321

(2) A case in which the addition circuit 312 adds an entry to the palette 321

(3) A case in which, after the fusion circuit 313 generates a fused entry, the addition circuit 312 adds an entry to the palette 321

Then, the association circuit 311 determines whether a second pixel included in the image to be encoded will be associated with any of the entries in the palette 321, on the basis of the changed threshold (step 405). The palette encoding circuit 315 encodes the image to be encoded by using the palette 321 (step 406).

The image encoding device 301 described above can efficiently generate a palette according to a target amount of information in palette encoding.

Figure 5:
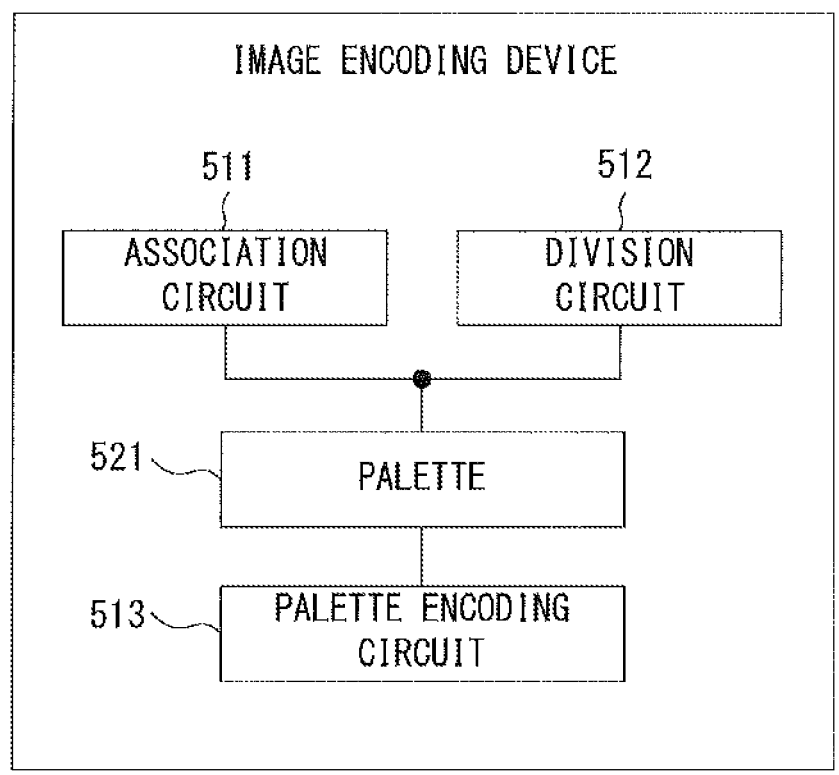
FIG. 5 is a block diagram illustrating a second image encoding device.

FIG. 5 illustrates an exemplary configuration of a second image encoding device according to the embodiments. An image encoding device 501 illustrated in FIG. 5 includes an association circuit 511, a division circuit 512, and a palette encoding circuit 513, and the image encoding device 501 encodes an image to be encoded by using a palette 521.

Figure 6:
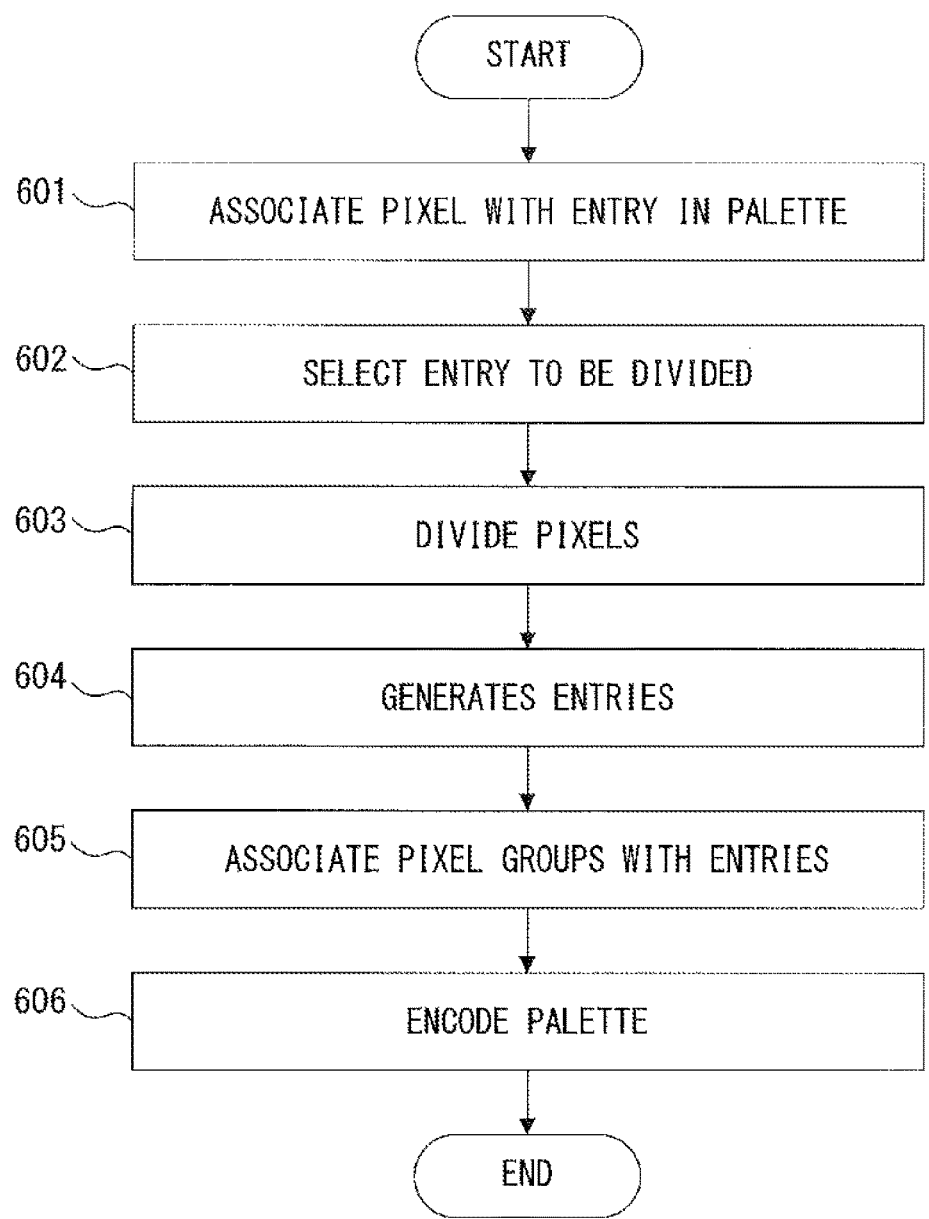
FIG. 6 is a flowchart of second image encoding processing.

FIG. 6 is a flowchart illustrating an example of second image encoding processing performed by the image encoding device 501 of FIG. 5. First, the association circuit 511 associates a pixel included in an image to be encoded with an entry in the palette 521 (step 601).

The division circuit 512 selects an entry to be divided from the palette 521 when an encoding result of the image to be encoded satisfies a condition of a target amount of information even after adding an entry to the palette 521 (step 602). Here, the division circuit 512 selects the entry to be divided on the basis of a difference between a palette value of each of the entries in the palette 521 and a pixel value of a pixel that has been associated with each of the entries.

Then, the division circuit 512 divides pixels associated with the entry to be divided into a plurality of pixel groups (step 603), and generates a plurality of entries that respectively correspond to the plurality of pixel groups (step 604). The division circuit 512 respectively associates the plurality of pixel groups with the plurality of entries (step 605). The palette encoding circuit 513 encodes the image to be encoded by using the palette 521 (step 606).

The image encoding device 501 described above can efficiently generate a palette according to a target amount of information in palette encoding.

Figure 7:
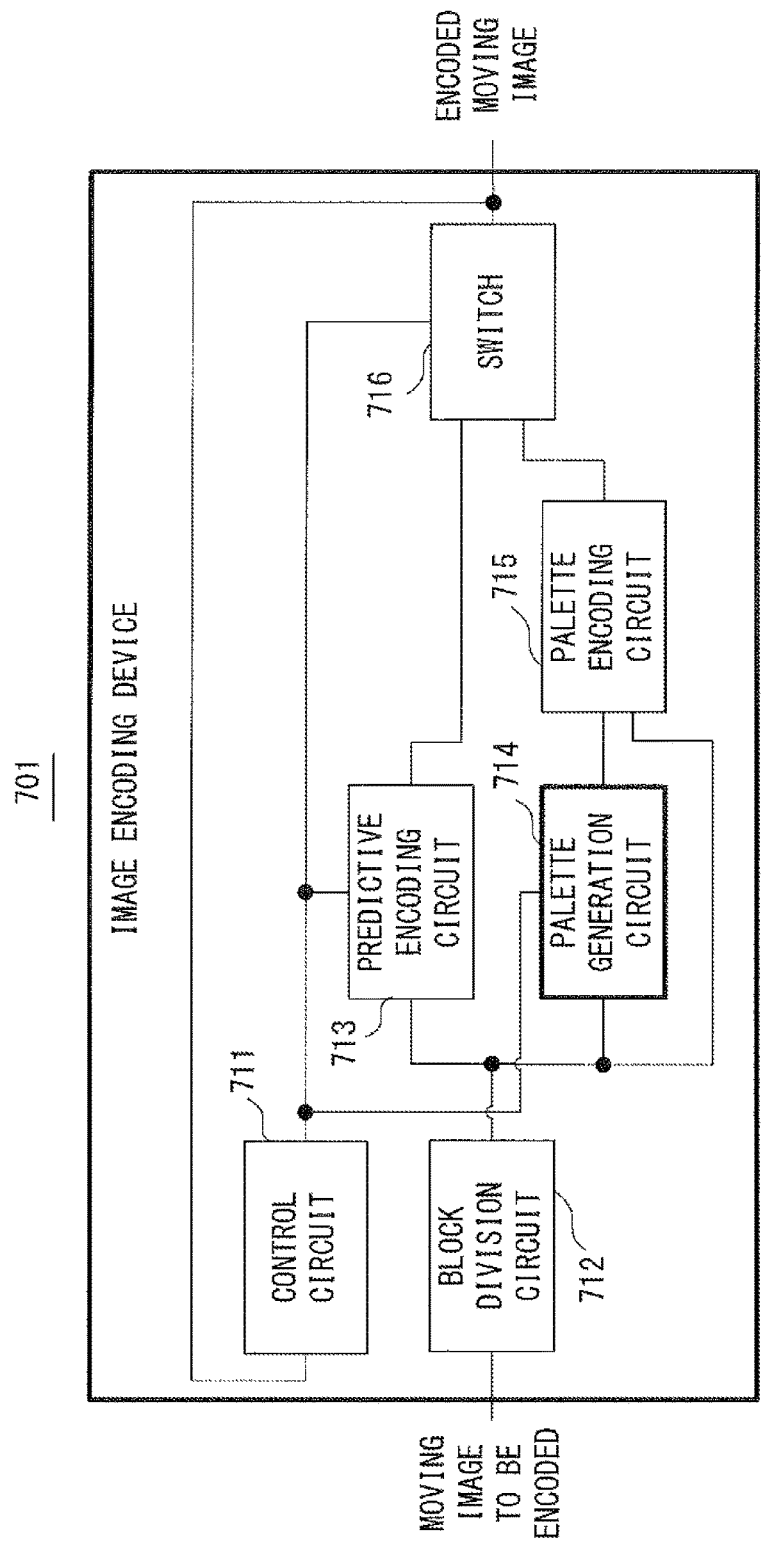
FIG. 7 is a block diagram illustrating a specific example of an image encoding device.

FIG. 7 illustrates a specific example of the image encoding device 301 illustrated in FIG. 3 or the image encoding device 501 illustrated in FIG. 5. An image encoding device 701 illustrated in FIG. 7 includes a control circuit 711, a block division circuit 712, a predictive encoding circuit 713, a palette generation circuit 714, a palette encoding circuit 715, and a switch 716.

The palette generation circuit 714 corresponds to the association circuit 311, the addition circuit 312, the fusion circuit 313, and the control circuit 314 illustrated in FIG. 3, and the association circuit 511 and the division circuit 512 illustrated in FIG. 5. The palette encoding circuit 715 corresponds to the palette encoding circuit 315 and the palette encoding circuit 513.

The image encoding device 701 can be implemented, for example, as a hardware circuit. In this case, respective components in the image encoding device 701 may be implemented as individual circuits, or may be implemented as one integrated circuit.

The image encoding device 701 encodes an input moving image to be encoded, and outputs the encoded moving image as a bitstream. The moving image to be encoded includes a plurality of pictures. Each of the pictures may be a color image, or may be a monochrome image. When the picture is a color image, a pixel value may be in an RGB format, or may be a YUV format.

The block division circuit 712 segments a picture to be encoded into respective blocks, and outputs the blocks to the predictive encoding circuit 713, the palette generation circuit 714, and the palette encoding circuit 715. The respective blocks output from the block division circuit 712 correspond to images to be encoded.

The control circuit 711 outputs a control signal indicating an encoding mode for each of the blocks to the predictive encoding circuit 713, the palette generation circuit 714, the palette encoding circuit 715, and the switch 716. The control circuit 711 also outputs, to the palette generation circuit 714, a condition of a target amount of information for an encoding result of the block. As the condition of the target amount of information, an upper limit value of a bit rate for each of the blocks can be used.

When the control signal output from the control circuit 711 indicates predictive encoding, the predictive encoding circuit 713 performs intra-predictive encoding or inter-predictive encoding on the block so as to generate coefficient information after orthogonal transformation and quantization, and outputs the coefficient information as an encoding result to the switch 716. In this case, the switch 716 selects and outputs the encoding result output from the predictive encoding circuit 713.

When the control signal output from the control circuit 711 indicates palette encoding, the palette generation circuit 714 generates a palette of a block from pixel values of respective pixels included in the block in accordance with the condition of the target amount of information output from the control circuit 711. The palette generation circuit 714 outputs the generated palette to the palette encoding circuit 715.

The palette encoding circuit 715 replaces the pixel values of the respective pixels in the block with indices by using the palette output from the palette generation circuit 714 so as to generate an index map. The palette encoding circuit 715 then outputs the palette and the index map as an encoding result to the switch 716. In this case, the switch 716 selects and outputs the encoding result output from the palette encoding circuit 715.

The image encoding device 701 transmits, to an image decoding device (not illustrated), an encoded moving image including the encoding results of the pictures, and the image decoding device decodes the encoded moving image so as to restore the moving image to be encoded.

The image encoding device 701 can be used for various purposes. As an example, the image encoding device 701 can be incorporated into a video camera, a video transmitter, a video receiver, a videophone system, a computer, or a mobile phone.

Figure 8:
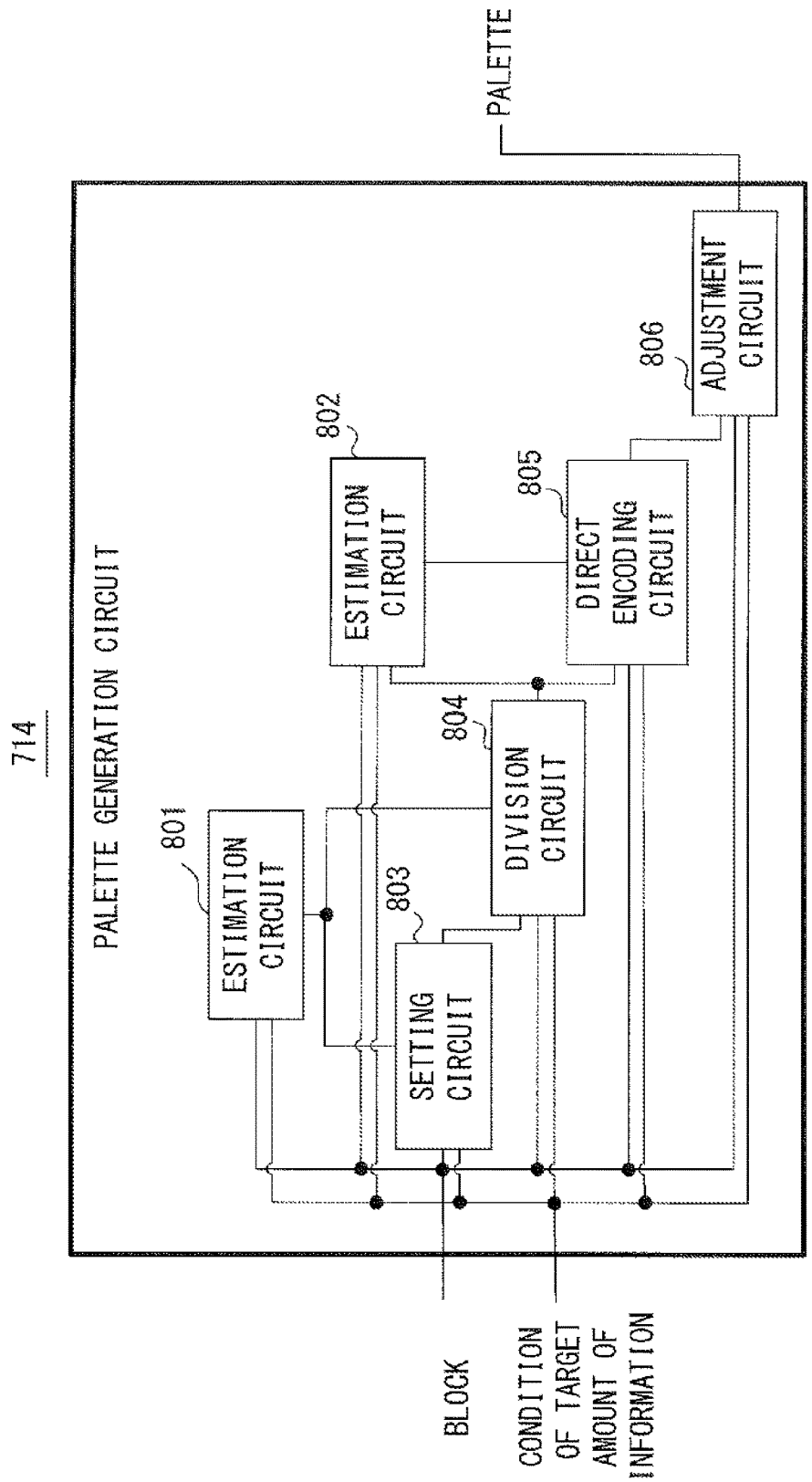
FIG. 8 is a block diagram illustrating a palette generation circuit.

FIG. 8 illustrates an exemplary configuration of the palette generation circuit 714 illustrated in FIG. 7. A palette generation circuit 714 illustrated in FIG. 8 includes an estimation circuit 801, an estimation circuit 802, a setting circuit 803, a division circuit 804, a direct encoding circuit 805, and an adjustment circuit 806.

The estimation circuit 801 estimates a first index on the basis of information relating to a block and a condition of a target amount of information, and outputs the first index to the setting circuit 803 and the division circuit 804. The first index is used to determine whether an encoding result of a block satisfies the condition of the target amount of information when palette encoding is performed on the block by using a generated palette. As the first index, the following indices can be used, for example.

(a1) An upper limit value of the number of entries in a palette (a2) A range of the number of entries in a palette (a3) The sum of the number of bits to encode a palette and the number of bits to encode an index map in a case in which arithmetic encoding is not performed after palette encoding (a4) The sum of the number of bits to encode a palette and the number of bits to encode an index map in a case in which arithmetic encoding is performed after palette encoding (a5) The number of pixels associated with respective entries in a palette in a case in which arithmetic encoding is performed after palette encoding The setting circuit 803 generates an initial palette of a block on the basis of the first index, and associates respective pixels in the block with entries in the initial palette. The setting circuit 803 then outputs, to the division circuit 804, a result of associating the respective pixels in the block with the entries in the initial palette, together with the initial palette.

The division circuit 804 selects an entry to be divided from the initial palette on the basis of the first index, divides a pixel group associated with the entry to be divided into a plurality of pixel groups, and generates a plurality of entries that correspond to the pixel groups. The division circuit 804 respectively associates the divided pixel groups with the generated entries, and outputs, to the direct encoding circuit 805, a result of associating the respective pixels with the entries in the palette, together with the palette including the generated entries.

The setting circuit 803 and the division circuit 804 may independently calculate the first index on the basis of the information relating to the block and the condition of the target amount of information, instead of using the first index output from the estimation circuit 801.

The estimation circuit 802 estimates a second index on the basis of the information relating to the block, the condition of the target amount of information, and the palette output from the division circuit 804, and outputs the second index to the direct encoding circuit 805. The second index is used to determine whether an encoding result of a block satisfies the condition of the target amount of information when some pixel values in the block are directly encoded by using an escape code without using the palette. As the second index, the following indices can be used, for example.

(b1) An upper limit value of the number of escape codes (b2) A range of the number of escape codes (b3) A weight on each of the entries that indicates a selection probability when a pixel to be directly encoded is selected from among pixels associated with respective entries in a palette The direct encoding circuit 805 calculates the number of pixels to be directly encoded on the basis of the second index, and selects a calculated number of pixels to be directly encoded from among pixels associated with entries in the palette. As an example, when an upper limit value of the number of escape codes is used as the second index, the upper limit value is used as the number of pixels to be directly encoded.

Here, the direct encoding circuit 805 may select the pixels to be directly encoded from among the pixels associated with the entries in the palette in descending order of a minimum value of differences between a pixel value and the respective palette values in the palette. Consequently, a pixel having a larger distortion can be preferentially replaced with the escape code.

Then, the direct encoding circuit 805 changes an encoding mode of the respective pixels to be directly encoded from palette encoding to direct encoding using the escape code. At this time, the direct encoding circuit 805 releases association of the pixels to be directly encoded with the entries, directly encodes pixel values of the pixels to be directly encoded, and associates the pixels to be directly encoded with the escape codes.

The direct encoding circuit 805 then outputs, to the adjustment circuit 806, a result of associating the respective pixels with the entries in the palette or the escape codes, together with the palette in which association with the respective pixels to be directly encoded has been released. Distortion of a decoding result can be minimized by allocating the escape codes to as many pixels as possible within a range in which the condition of the target amount of information is satisfied.

The adjustment circuit 806 performs clustering on the palette in order to adjust distortion that has been generated in the entries in the palette by changing the encoding mode of the pixels to be directly encoded. More specifically, the adjustment circuit 806 adjusts palette values of the respective entries in the palette in such a way that distortion between the palette values of the respective entries and the pixel groups associated with the respective entries is minimized.

At this time, the adjustment circuit 806 performs iterative processing a prescribed number of times by using the pixel groups associated with the respective entries in the palette as an initial state, and updates the palette values of the respective entries and association of the respective entries with the pixel groups. The pixel group associated with each of the entries is used as a cluster, and the palette value of each of the entries is used as the center of gravity of the cluster. The prescribed number of times can be determined by the trade-off between quality of a clustering result and processing time.

The adjustment circuit 806 outputs a result of associating the respective pixels with the entries in the palette or the escape codes, together with the updated palette. When the direct encoding circuit 805 does not directly encode any of the pixels in the block, the adjustment circuit 806 does not need to adjust the palette of the block.

FIG. 9 is a flowchart illustrating an example of palette generation processing performed by the palette generation circuit 714 of FIG. 7. First, the setting circuit 803 generates an initial palette of a block (step 901). Then, the division circuit 804 divides a pixel group associated with an entry to be divided in the initial palette into a plurality of pixel groups so as to divide the entry to be divided (step 902). The direct encoding circuit 805 changes an encoding mode of pixels to be directly encoded from palette encoding to direct encoding (step 903), and the adjustment circuit 806 performs clustering on the entries in the palette (step 904).

Figure 10:
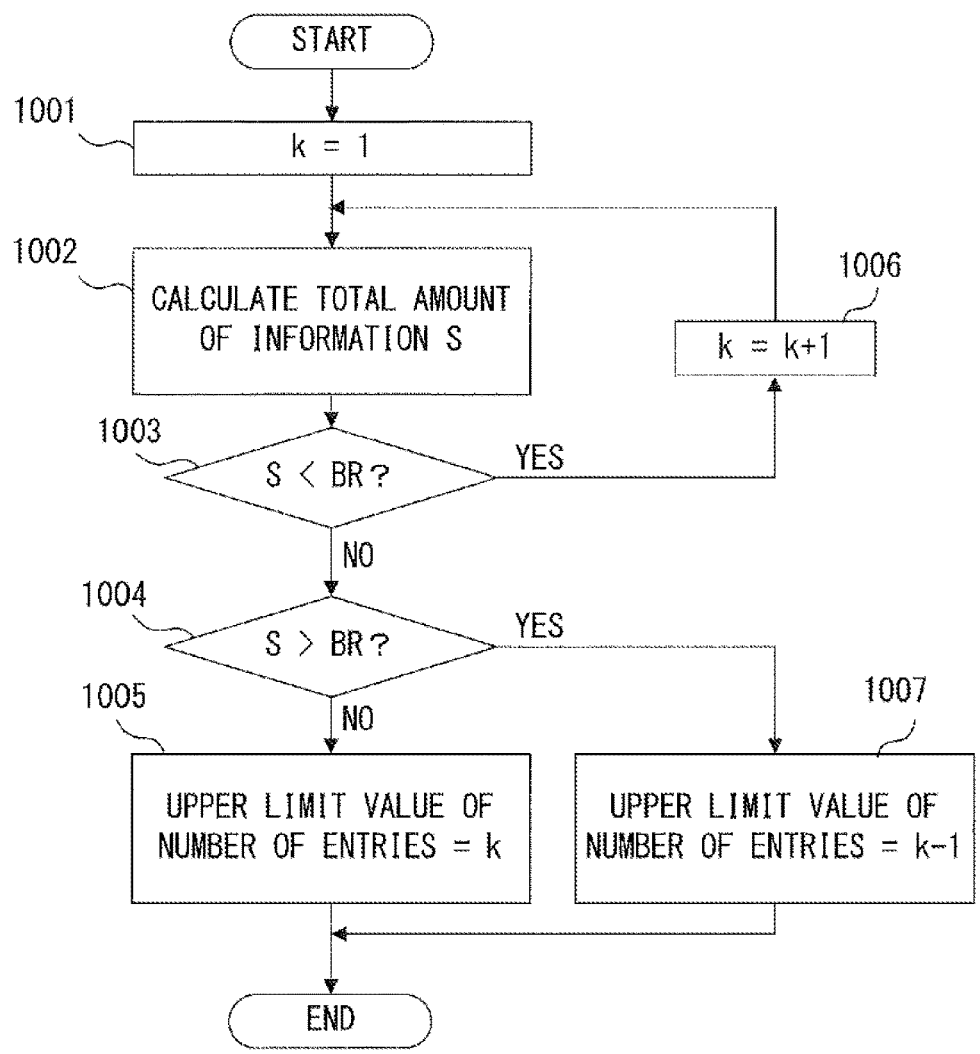
FIG. 10 is a flowchart of first index estimation processing.

FIG. 10 is a flowchart illustrating an example of first index estimation processing performed by the estimation circuit 801. In this example, an upper limit value of a bit rate is used as a condition of a target amount of information, and an upper limit value of the number of entries in a palette is estimated as a first index.

First, the estimation circuit 801 sets a control variable k indicating the number of entries to 1 (step 1001), and calculates a total amount of information S of a palette and an index map (step 1002). The total amount of information S can be calculated, for example, according to the following expression.

$$S=k*nb\_cc*\text{ndepth}+\ln_2(k)*nb\_\text{pixel} \quad (11)$$

In expression (11), nb_cc is the number of color components included in a pixel value, ndepth is the number of bits of each of the color components, $\ln_2(k)$ is the number of bits of each of the indices, and nb_pixel is the number of pixels included in a block.

The estimation circuit 801 checks whether the total amount of information S is smaller than an upper limit value BR of a bit rate (step 1003). When the total amount of information S is smaller than the upper limit value BR (step 1002, YES), the estimation circuit 801 increments k by 1 (step 1006), and repeats the process of step 1002 and the processes that follow.

When the total amount of information S is greater than or equal to the upper limit value BR (step 1002, NO), the estimation circuit 801 checks whether the total amount of information S is greater than the upper limit value BR of the bit rate (step 1004). When the total amount of information S is greater than the upper limit value BR (step 1004, YES), the estimation circuit 801 determines k−1 to be an upper limit value of the number of entries (step 1007). When the total amount of information S is equal to the upper limit value BR (step 1004, NO), the estimation circuit 801 determines k to be the upper limit value of the number of entries (step 1005).

In this case, the estimation circuit 802 can estimate an upper limit value of the number of escape codes as the second index on the basis of the upper limit value BR of the bit rate.

First, the estimation circuit 802 calculates the total amount of information S of the palette and the index map by using the number of entries in the palette output from the division circuit 804 as k in expression (11). Then, the estimation circuit 802 calculates the upper limit value of the number of escape codes by dividing a difference between the upper limit value BR of the bit rate and the total amount of information S by the number of bits per escape code.

FIG. 11 illustrates an exemplary configuration of the setting circuit 803 of FIG. 8. A setting circuit 803 illustrated in FIG. 11 includes a control circuit 1101, a switch 1102, a fusion circuit 1103, an addition circuit 1104, an updating circuit 1105, an association circuit 1106, and a switch 1107.

The control circuit 1101 outputs a control signal indicating which of fusion processing, addition processing, updating processing, and association processing will be performed. The fusion processing is processing for combining two entries in a palette so as to generate a fused entry. The addition processing is processing for adding an entry to a palette. The updating processing is processing for updating a palette value of an entry in a palette. The associating processing is processing for associating a pixel of a block with an entry in a palette.

The control circuit 1101 receives the first index output from the estimation circuit 801, and outputs the received first index. The control circuit 1101 can estimate a first index on the basis of information relating to a block and a condition of a target amount of information, and can outputs the estimated first index.

When the control signal output from the control circuit 1101 indicates the fusion processing, the switch 1102 outputs, to the fusion circuit 1103, a block and a palette output from the switch 1107. When the control signal indicates the addition processing, the switch 1102 outputs the block and the palette to the addition circuit 1104. When the first entry is added to an empty palette, the switch 1102 outputs only the block to the addition circuit 1104.

When the control signal indicates the updating processing, the switch 1102 outputs the block and the palette to the updating circuit 1105. When the control signal indicates the association processing, the switch 1102 outputs the block and the palette to the association circuit 1106.

When the control signal indicates the fusion processing, the fusion circuit 1103 selects two entries in the palette, combines two pixel groups that have respectively been associated with the two selected entries, and generates one pixel group. Then, the fusion circuit 1103 generates a new entry in the palette as a fused entry, associates the generated pixel group with the fused entry, and deletes the two selected entries from the palette. The fusion circuit 1103 outputs, to the switch 1107, a result of associating respective pixels with entries, together with the updated palette.

The addition circuit 1104 generates a new entry that has, as a palette value, a pixel value of a pixel that has not been associated with an entry in the palette from among pixels in the block, and associates the pixel with the generated entry. The addition circuit 1104 outputs, to the switch 1107, a result of associating the respective pixels with the entries, together with the updated palette.

The updating circuit 1105 updates palette values of the respective entries in the palette in such a way that distortion between the palette values of the respective entries and the pixel groups associated with the respective entries is minimized. The updating circuit 1105 outputs, to the switch 1107, a result of associating the respective pixels with the entries, together with the updated palette.

The association circuit 1106 selects a pixel that has not been associated with an entry in the palette from among pixels in the block, and determines whether the selected pixel will be associated with any of the entries in the palette.

At this time, the association circuit 1106 compares a difference between a pixel value of the selected pixel and a palette value of a specific entry in the palette with a threshold. When the difference is smaller than or equal to the threshold, the association circuit 1106 associates the selected pixel with the specific entry. When the difference is greater than the threshold, the association circuit 1106 does not associate the selected pixel with the specific entry. The association circuit 1106 outputs, to the switch 1107, a result of associating the respective pixels with the entries, together with the palette.

When the control signal indicates the fusion processing, the switch 1107 outputs the palette and the association result that have been output from the fusion circuit 1103. When the control signal indicates the addition processing, the switch 1107 outputs the palette and the association result that have been output from the addition circuit 1104. When the control signal indicates the updating processing, the switch 1107 outputs the palette and the association result that have been output from the updating circuit 1105. When the control signal indicates the association processing, the switch 1107 outputs the palette and the association result that have been output from the association circuit 1106.

The setting circuit 803 associates all of the pixels in the block with any of the entries in the palette by repeating the fusion processing, the addition processing, the updating processing, and the association processing, and outputs the finally updated palette as an initial palette.

Figure 12:
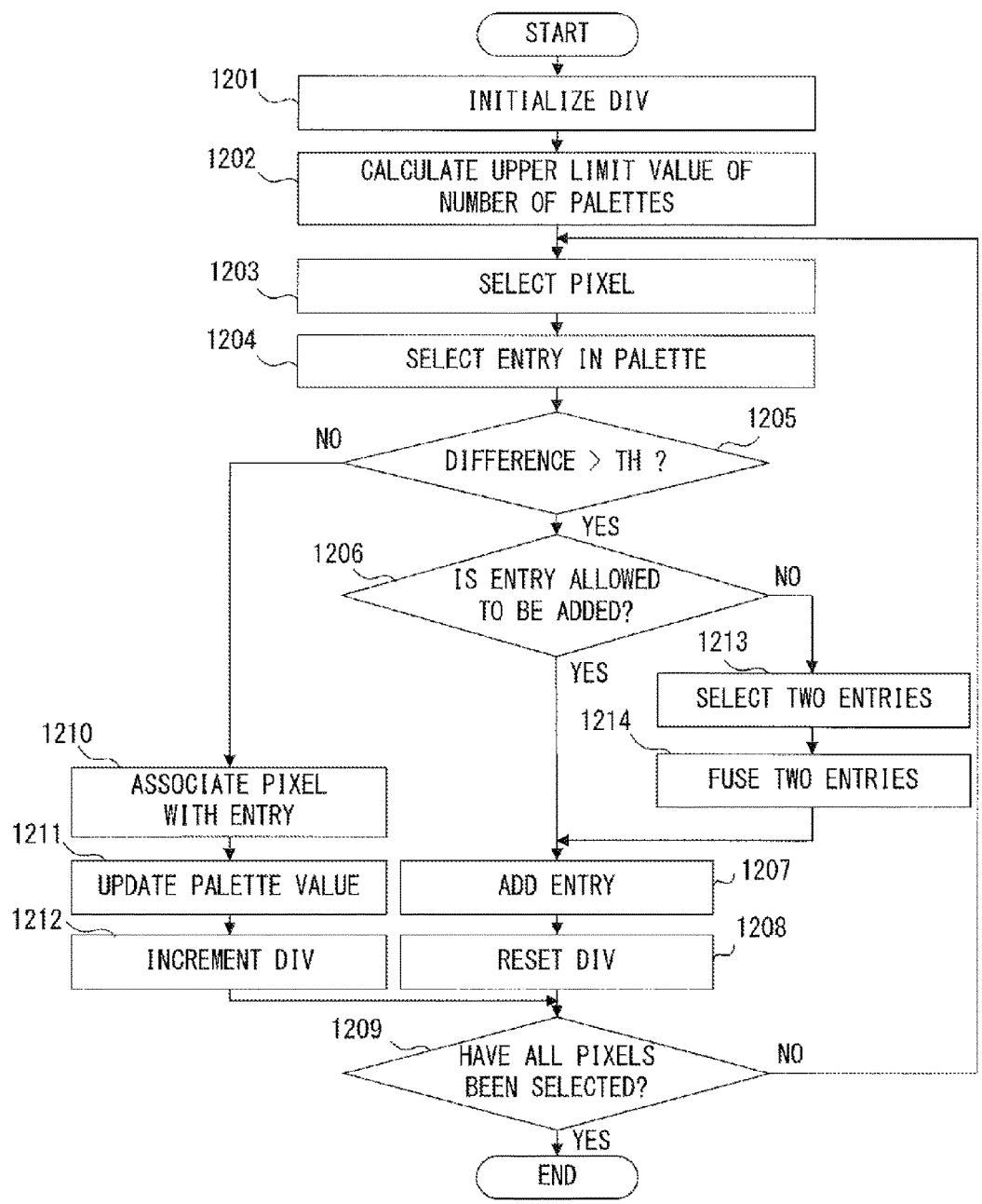
FIG. 12 is a flowchart of initial palette generation processing.

FIG. 12 is a flowchart illustrating an example of initial palette generation processing that is performed by the setting circuit 803 in step 901 of FIG. 9. First, the control circuit 1101 initializes a variable DIV used to calculate a threshold TH for a difference between a pixel value and a palette value, and outputs the variable DIV to the association circuit 1106 (step 1201). Consequently, DIV is set to 1.

Then, the control circuit 1101 calculates an upper limit value of the number of palettes (step 1202). At this time, the control circuit 1101 may use the upper limit value of the number of palettes that has been received as the first index from the estimation circuit 801 with no change, or may calculate the upper limit value of the number of palettes on the basis of the information relating to the block and the condition of the target amount of information, similarly to the estimation circuit 801.

Then, the association circuit 1106 selects a pixel that has not been associated with an entry in the palette from among pixels in the block (step 1203). The association circuit 1106 calculates a difference between a pixel value of the selected pixel and a palette value of each of the entries in the palette, and selects an entry in which a palette value has the smallest difference (step 1204).

Then, the association circuit 1106 calculates TH by using DIV, and compares a difference between the pixel value of the selected pixel and a palette value of the selected entry with TH (step 1205). TH can be calculated, for example, according to the following expression.

$$TH = \text{Max}(\text{Min\_dist}/\text{DIV}, \text{Min\_size}) \quad (12)$$

In expression (12), Min_dist is a minimum value of a difference between two palette values that is calculated from all combinations of entries in a palette. When the number of entries in a palette is smaller than or equal to 1, Min_dist is set to 0. Min_size is a constant that indicates a minimum size of a cluster of a pixel group associated with one entry in a pixel-value space that is a color space indicated by a pixel value, and Min_size is set in advance. Max ( ) represents a maximum value.

According to expression (12), as Min_dist increases, TH also increases, and as Min_dist decreases, TH also decreases. On the other hand, as DIV increases, TH decreases, and as DIV decreases, TH increases. Note that a minimum value of TH is Min_size.

When the difference is smaller than or equal to TH (step 1205, NO), the association circuit 1106 associates the selected pixel with the selected entry (step 1210), and the updating circuit 1105 updates a palette value of the entry associated with the pixel (step 1211). The updated palette value PV can be calculated, for example, according to the following expression.

$$PV = \Sigma(p \ast n(P))/\Sigma(n(p)) \quad (13)$$

In expression (13), n(p) is the number of pixels having a pixel value p that have been associated with an entry, and Σ( ) represents the total with respect to all the pixel values p. Accordingly, PV in expression (13) expresses a weighted mean of pixel values of all of the pixels associated with an entry. According to expression (13), the total of differences between the updated palette value PV and pixel values of all of the pixels associated with the entry having the updated palette value PV can be minimized.

Then, the control circuit 1101 increments DIV by 1, and outputs DIV to the association circuit 1106 (step 1212). When DIV reaches the upper limit value calculated in step 1202, the control circuit 1101 does not change DIV.

The control circuit 1101 then checks whether all of the pixels in the block have been selected (step 1209). When not all of the pixels have been selected (step 1209, NO), the setting circuit 803 repeats the process of step 1203 and the processes that follow.

When the difference is greater than TH (step 1205, YES), the control circuit 1101 checks whether an entry is allowed to be added, on the basis of the upper limit value of the number of palettes (step 1206). When the number of palettes is smaller than the upper limit value, it is determined that an entry is allowed to be added, and when the number of palettes reaches the upper limit value, it is determined that an entry is not allowed to be added.

When an entry is allowed to be added (step 1206, YES), the addition circuit 1104 generates a new entry having the pixel value of the pixel selected in step 1203 as a palette value, and associates the pixel with the generated entry (step 1207). Then, the control circuit 1101 resets DIV to 1, and outputs DIV to the association circuit 1106 (step 1208). The setting circuit 803 repeats the process of step 1203 and the processes that follow.

When an entry is not allowed to be added (step 1206, NO), the fusion circuit 1103 selects two entries in the palette (step 1213). At this time, the fusion circuit 1103 refers to, for example, palette values of all of the entries in the palette, obtains a minimum value of differences between two palette values, and selects two entries that correspond to the minimum value.

The fusion circuit 1103 then combines two pixel groups that have respectively been associated with the two selected entries so as to generate one pixel group (step 1214). The fusion circuit 1103 generates a new entry in the palette as a fused entry, associates the generated pixel group with the fused entry, and deletes the two selected entries from the palette. In addition, the updating circuit 1105 updates a palette value of the fused entry associated with the pixel group. The updated palette value PV can be calculated, for example, according to expression (13).

By fusing two entries into one entry, the number of entries decreases by 1, and therefore an entry can be added. By fusing two entries that correspond to the minimum value of differences between palette values, distortion of a distribution of pixel values can be minimized within a pixel group associated with the fused entry.

After two entries are fused, the setting circuit 803 performs the process of step 1207 and the processes that follow. When all of the pixels in the block have been selected (step 1209, YES), the setting circuit 803 terminates processing, and outputs the generated palette as an initial palette.

In the initial palette generation processing described above, when a pixel can be associated with an existing entry without adding an entry in a palette, DIV is incremented by 1, and TH in expression (12) decreases. Consequently, whether a pixel selected next will be associated with an existing entry can be determined by using a smaller threshold, and a pixel that has a value closer to a palette value can be associated.

When an entry is added in the palette, DIV is reset to 1, and TH in expression (12) increases. Consequently, whether a pixel selected next will be associated with an existing entry can be determined by using a greater threshold, and an entry is suppressed from being further added. Accordingly, the number of times of iteration of the fusion processing performed when the number of entries reaches an upper limit value is reduced, and a load of recalculation of a palette value of a fused entry and association of the fused entry with a pixel group is reduced.

Further, as Min_dist increases, TH also increases, and therefore whether a pixel selected next will be associated with an existing entry can be determined by using a greater threshold. Accordingly, as Min_dist increases, an entry is suppressed more from being added, and a load of the fusion processing is reduced.

In step 1205, the association circuit 1106 may calculate TH according to the following expression instead of expression (12).

$$TH=\text{Max}(\text{Ave\_dist}/\text{DIV}, \text{Min\_size}) \quad (14)$$

In expression (14), Ave_dist is a mean value of differences between two palette values that are calculated from all combinations of entries in a palette, and Ave_dist can be calculated according to the following expression.

$$\text{Ave\_dist} = \frac{\sum_{i=1}^{M-1} \sum_{j=i+1}^{M} \text{Dist}(pi, pj)}{M*(M-1)/2} \quad (15)$$

In expression (15), M is the number of entries in a palette, pi and pj are respectively palette values of i-th (i=1 to M−1) and j-th (j=i+1 to M) entries, and Dist(pi,pj) is a difference between pi and pj. When the number of entries in the palette is smaller than or equal to 1, Ave_dist is set to 0.

According to expression (14), as Ave_dist increases, TH also increases, and as Ave_dist decreases, TH also decreases. By using TH in expression (14), whether a pixel will be associated with an existing entry can be determined with a precision higher than the precision in a case in which TH in expression (12) is used.

Figure 13:
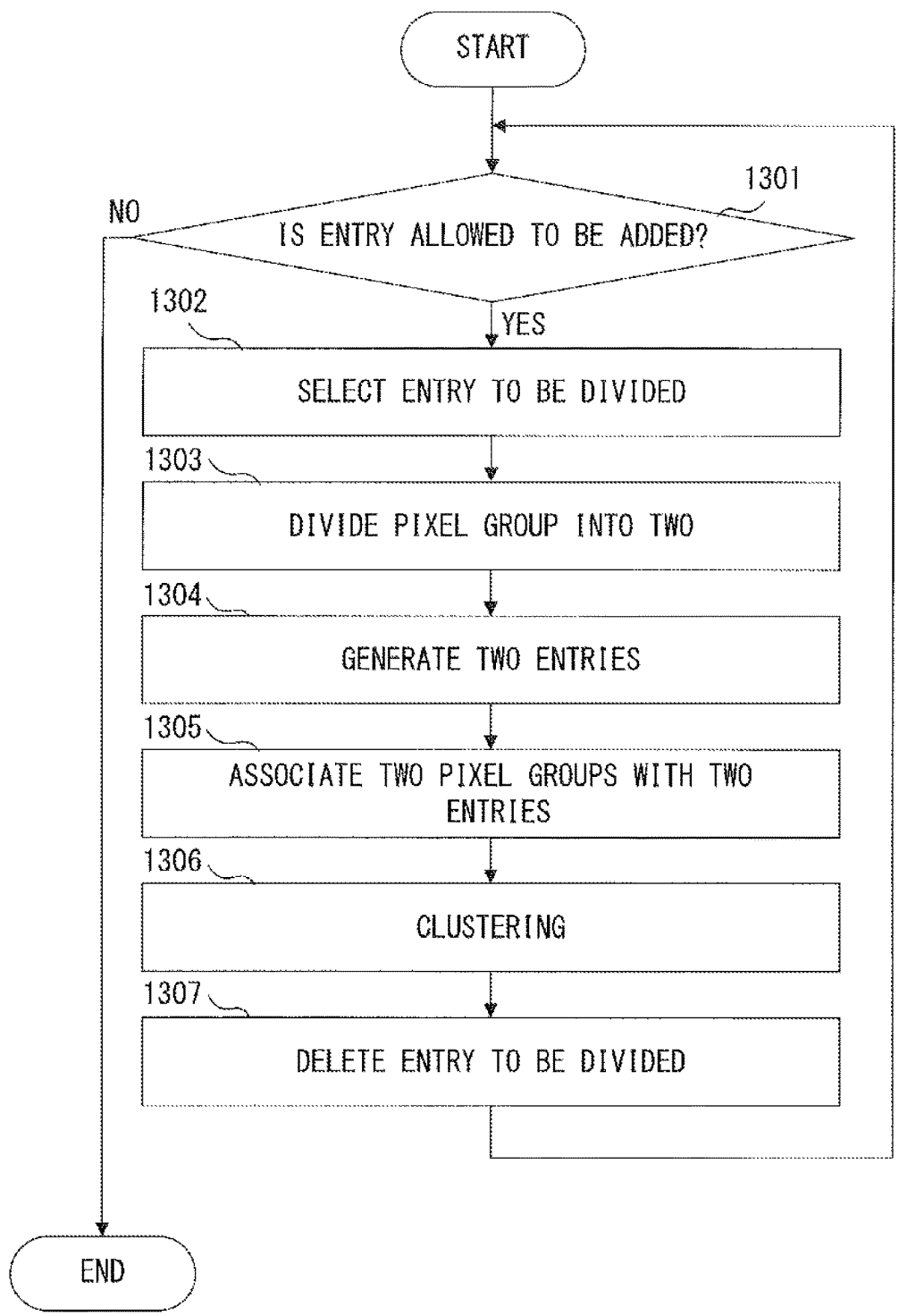
FIG. 13 is a flowchart of division processing.

FIG. 13 is a flowchart illustrating an example of division processing that is performed by the division circuit 804 in step 902 of FIG. 9. First, the division circuit 804 checks whether an entry is allowed to be added, on the basis of the upper limit value of the number of palettes that has been received as the first index from the estimation circuit 801 (step 1301). When the number of palettes is smaller than the upper limit value, it is determined that an entry is allowed to be added, and when the number of palettes reaches the upper limit value, it is determined that an entry is not allowed to be added.

When an entry is not allowed to be added (step 1301, NO), the division circuit 804 terminates processing, and outputs the initial palette output from the setting circuit 803.

When an entry is allowed to be added (step 1301, YES), the division circuit 804 selects an entry to be divided from among entries with which two or more pixels have been associated in the initial palette (step 1302).

At this time, the division circuit 804 calculates, for example, the total of differences between a palette value of each of the entries in the initial palette and pixel values of pixels associated with that entry, obtains a maximum value of the totals of differences, and selects an entry that corresponds to the maximum value as an entry to be divided. Consequently, an entry having a largest distortion between a palette value and a pixel group can be selected as an entry to be divided.

Then, the division circuit 804 divides the pixel group associated with the entry to be divided into two pixel groups that each include one or more pixels (step 1303).

The division circuit 804 generates two entries that correspond to the two divided pixel groups, and adds the two entries in the initial palette (step 1304). At this time, the division circuit 804 selects palette values p1 and p2 of the two entries so as to satisfy the following conditions, for example, in a pixel-value space.

(c1) p1 and p2 are located on the sides different from each other with respect to a palette value p0 of the entry to be divided on a straight line passing through the palette value p0.

(c2) p1 and p2 are located asymmetrically with respect to p0.

Figure 14:
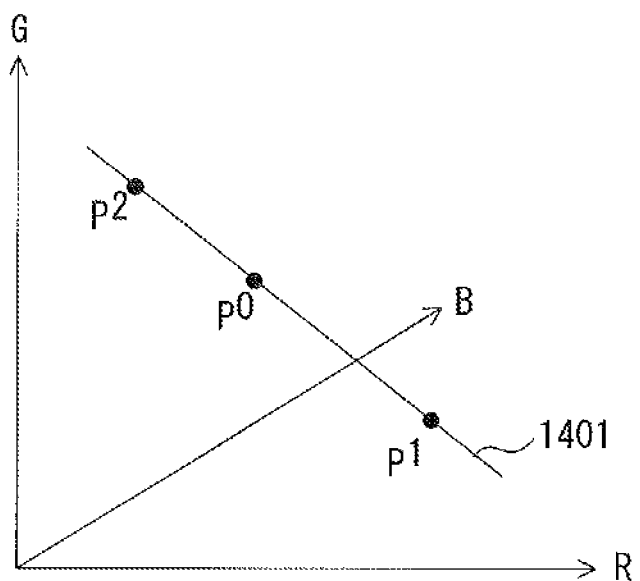
FIG. 14 illustrates palette values in an RGB color space.

FIG. 14 illustrates examples of p0, p1, and p2 in a case in which a pixel-value space is an RGB color space. Each of p0, p1, and p2 indicates three-dimensional coordinates (R, G, B) in the RGB color space. A straight line 1401 is a straight line that passes through p0, and p1 and p2 are located on the sides different from each other with respect to p0 on the straight line 1401. In this example, p1 and p2 are selected so as to satisfy the following expression.

$$p2=(3/2)*p0-(1/2)*p1 \quad (16)$$

In expression (16), a distance from p0 to p1 is set to be twice the distance from p0 to p2. As p1, for example, a pixel value located farthest from p0 can be used from among pixel values of pixels associated with the entry to be divided.

The division circuit 804 respectively associates the two divided pixel groups with the two generated entries (step 1305).

The division circuit 804 then performs clustering on the palette in order to adjust distortion of the entries in the palette that has been generated due to division of the entry to be divided (step 1306). More specifically, the division circuit 804 performs iteration a prescribed number of times by using the two pixel groups associated with the two entries as an initial state, and updates palette values of respective entries and association of the respective entries with the pixel groups. The prescribed number of times can be determined by the trade-off between quality of a clustering result and processing time.

The division circuit 804 deletes the entry to be divided from the initial palette (step 1307), specifies the updated palette to be a target to be processed, and repeats the process of step 1301 and the processes that follow. When an entry is not allowed to be added (step 1301, NO), the division circuit 804 terminates processing, and outputs the updated palette.

By selecting p1 and p2 so as to be located on the sides different from each other on a straight line passing through p0 in step 1304, convergence of clustering in step 1306 can be promoted, and a highly precise clustering result can be obtained in a short time. At this time, by selecting p1 and p2 so as to be located asymmetrically, not symmetrically, with respect to p0, respective pixel groups after division can be associated more efficiently with palette values.

In the division processing above, an entry is repeatedly divided until the number of entries reaches an upper limit value, and the size of a pixel group associated with each of the divided entries is reduced. Accordingly, distortion between palette values of the respective entries and pixel groups associated with the respective entries can be minimized within a range that satisfies a condition of a target amount of information.

The configurations of the image encoding device 301 of FIG. 3, the image encoding device 501 of FIG. 5, and the image encoding device 701 of FIG. 7 are examples, and some components may be omitted or changed according to the purposes or conditions of the image encoding device. As an example, in the image encoding device 701 of FIG. 7, when predictive encoding is not performed on a block, the predictive encoding circuit 713 and the switch 716 can be omitted.

The configuration of the palette generation circuit 714 of FIG. 8 is an example, and some components may be omitted or changed according to the purposes or conditions of the image encoding device. As an example, when the first index is input from the outside of the image encoding device, the estimation circuit 801 can be omitted, and when the second index is input from the outside of the image encoding device, the estimation circuit 802 can be omitted.

When an entry in a palette is not divided, the division circuit 804 can be omitted. When distortion of entries in a palette that has been generated due to direct encoding on pixel values is small, the adjustment circuit 806 can be omitted. When a pixel value is not directly encoded, the direct encoding circuit 805 and the adjustment circuit 806 can be omitted.

The configuration of the setting circuit 803 of FIG. 11 is an example, and some components may be omitted or changed according to the purposes or conditions of the image encoding device. As an example, when entries in a palette are not fused, the fusion circuit 1103 can be omitted.

The flowcharts illustrated in FIGS. 4, 6, 9, 10, 12, and 13 are examples, and some processes may be omitted or changed according to the configuration or conditions of the image encoding device. As an example, when an entry in a palette is not divided in the palette generation processing of FIG. 9, the process of step 902 can be omitted. When distortion of entries in a palette that has been generated due to direct encoding of pixel values is small, the process of step 904 can be omitted. When a pixel value is not directly encoded, the processes of steps 903 and 904 can be omitted.

In steps 1202 and 1206 of the initial palette generation processing of FIG. 12, the control circuit 1101 may use another first index instead of an upper limit value of the number of palettes. Insteps 1208 and 1212, the control circuit 1101 may directly change a threshold TH instead of changing a variable DIV used to calculate the threshold TH.

In the division processing of FIG. 13, when distortion of entries in a palette that has been generated due to division of an entry to be divided is small, the process of step 1306 can be omitted. In step 1301, the division circuit 804 may use another first index instead of an upper limit value of the number of palettes.

In step 1303, the division circuit 804 may divide a pixel group associated with an entry to be divided into three or more pixel groups that each include one or more pixels. In this case, in step 1304, the division circuit 804 generates a prescribed number of entries that is the same as the number of divided pixel groups, and adds the entries to an initial palette.

Figure 2:
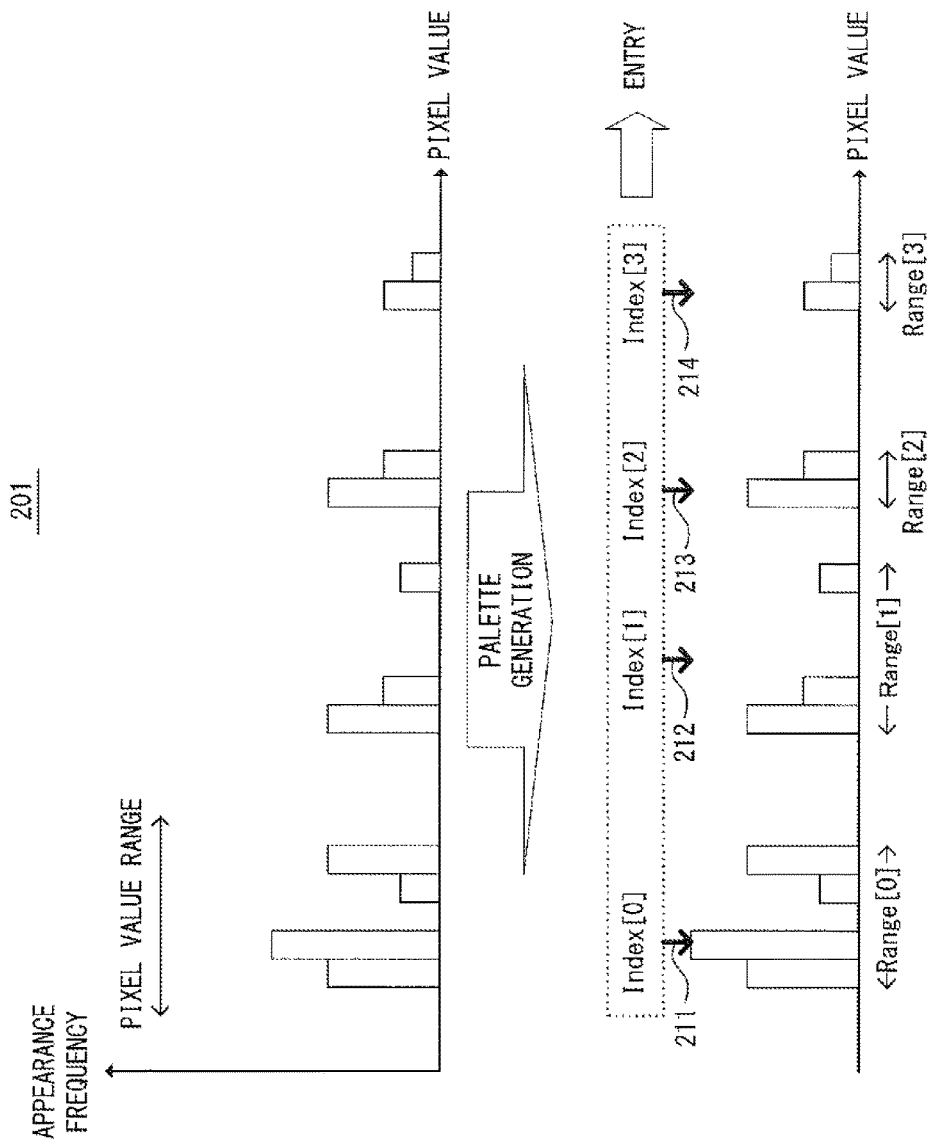
FIG. 2 illustrates a palette generation method.

The image 101, the index map 102, and the palette 103 of FIG. 1 and the histogram 201 of FIG. 2 are examples, and another image and the like may be used according to the configuration or conditions of the image encoding device. The palette values p0, p1, and p2 of FIG. 14 are examples, and other palette values may be used according to the configuration or conditions of the image encoding device. As an example, when a pixel value is not in the RGB format, a color space that is not the RGB color space is used as a pixel-value space.

Expressions (1) to (16) are examples, and other calculation expressions may be used according to the configuration or conditions of the image encoding device. As an example, another calculation expression in which a distance from p0 to p1 is different from a distance from p0 to p2 can be used instead of expression (16).

An image to be encoded on which palette encoding is performed is not limited to a screen content image, and another image having a small variety of pixel values may be used. In addition, the image to be encoded on which palette encoding is performed is not limited to a moving image, and a still image may be used.

Figure 15:
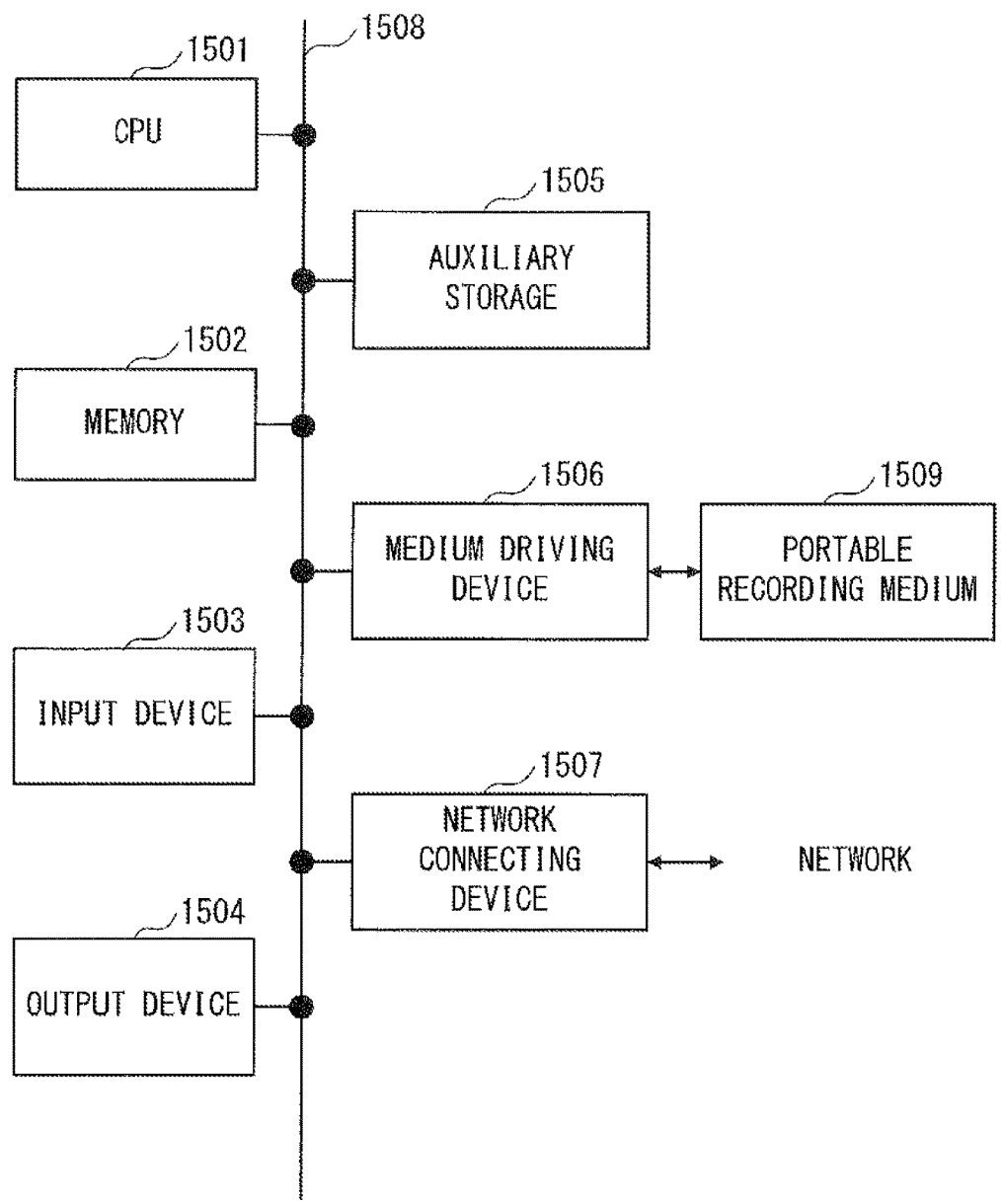
FIG. 15 is a block diagram illustrating an information processing device.

The image encoding device 301 of FIG. 3, the image encoding device 501 of FIG. 5, and the image encoding device 701 of FIG. 7 can be implemented as hardware circuits, and can be implemented by using an information processing device (a computer) illustrated in FIG. 15.

The information processing device illustrated in FIG. 15 includes a Central Processing Unit (CPU) 1501, a memory 1502, an input device 1503, an output device 1504, an auxiliary storage 1505, a medium driving device 1506, and a network connecting device 1507. These components are connected to each other via a bus 1508.

The memory 1502 is a semiconductor memory such as a Read Only Memory (ROM), a Random Access Memory (RAM), or a flash memory, and the memory 1502 stores a program and data used to perform image encoding processing. The data stored in the memory 1502 includes an image to be encoded, a palette, a result of associating respective pixels with entries in a palette or escape codes, an encoding result, and the like.

The CPU 1501 (a processor) operates as the association circuit 311, the addition circuit 312, the fusion circuit 313, the control circuit 314, and the palette encoding circuit 315 of FIG. 3, for example, by executing a program by using the memory 1502. The CPU 1501 also operates as the association circuit 511, the division circuit 512, and the palette encoding circuit 513 of FIG. 5. The CPU 1501 further operates as the control circuit 711, the block division circuit 712, the predictive encoding circuit 713, the palette generation circuit 714, the palette encoding circuit 715, and the switch 716 of FIG. 7.

The CPU 1501 also operates as the estimation circuit 801, the estimation circuit 802, the setting circuit 803, the division circuit 804, the direct encoding circuit 805, and the adjustment circuit 806 of FIG. 8. The CPU 1501 further operates as the control circuit 1101, the switch 1102, the fusion circuit 1103, the addition circuit 1104, the updating circuit 1105, the association circuit 1106, and the switch 1107.

Examples of the input device 1503 include a keyboard and a pointing device, and the input device 1503 is used to input an instruction or information from a user or an operator. Examples of the output device 1504 include a display device, a printer, and a speaker, and the output device 1504 is used to output an inquiry or a processing result to a user or an operator.

Examples of the auxiliary storage 1505 include a magnetic disk drive, an optical disk drive, a magneto-optical disk drive, and a tape device. The auxiliary storage 1505 may be a hard disk drive. The information processing device can store a program and data in the auxiliary storage 1505, and can use the program and the data by loading them onto the memory 1502.

The medium driving device 1506 drives a portable recording medium 1509, and accesses the content recorded in the portable recording medium 1509. Examples of the portable recording medium 1509 include a memory device, a flexible disk, an optical disk, and a magneto-optical disk. The portable recording medium 1509 may be a Compact Disk Read Only Memory (CD-ROM), a Digital Versatile Disk (DVD), or a Universal Serial Bus (USB) memory. A user or an operator can store a program and data in the portable recording medium 1509, and can use the program and the data by loading them onto the memory 1502.

As described above, a computer-readable recording medium that stores a program and data used to perform processing includes a physical (non-transitory) recording medium such as the memory 1502, the auxiliary storage 1505, or the portable recording medium 1509.

The network connecting device 1507 is a communication interface that is connected to a communication network such as a Local Area Network (LAN) or the internet, and that performs data conversion associated with communication. The network connecting device 1507 can transmit an encoded moving image to an image decoding device. The information processing device can receive a program and data from an external device via the network connecting device 1507, and can use the program and the data by loading them onto the memory 1502.

The information processing device does not need to include all of the components illustrated in FIG. 15, and some components can be omitted according to purposes or conditions. As an example, when an interface with a user or an operator is not needed, the input device 1503 and the output device 1504 may be omitted. When the information processing device does not access the portable recording medium 1509, the medium driving device 1506 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image encoding device that encodes an image to be encoded by using a palette, the image encoding device comprising:
    an association circuit that determines whether a first pixel included in the image to be encoded will be associated with any entry in the palette, on the basis of a threshold for a difference between a pixel value of the first pixel and a palette value;
    an addition circuit that adds an entry for the first pixel to the palette when the association circuit does not associate the first pixel with any of the entries in the palette;
    a fusion circuit that fuses two entries in the palette so as to generate a fused entry when an encoding result of the image to be encoded does not satisfy a condition of a target amount of information by adding an entry to the palette;
    a control circuit that changes the threshold when the association circuit associates the first pixel with any of the entries in the palette, when the addition circuit adds the entry for the first pixel to the palette, or when the fusion circuit generates the fused entry and the addition circuit adds the entry for the first pixel to the palette; and
    a palette encoding circuit that encodes the image to be encoded by using the palette, wherein
    the association circuit determines whether a second pixel included in the image to be encoded will be associated with any of the entries in the palette, on the basis of the changed threshold for a difference between a pixel value of the second pixel and a palette value.

2. The image encoding device according to claim 1, wherein
    the fusion circuit generates the fused entry when an amount of information of the encoding result exceeds the target amount of information after adding an entry to the palette, the addition circuit adds the entry for the first pixel to the palette after the fusion circuit generates the fused entry, the control circuit changes the threshold to a larger value, and the association circuit associates the second pixel with a specific entry in the palette when a difference between a pixel value of the second pixel and a palette value of the specific entry is smaller than the changed threshold.

3. The image encoding device according to claim 1, wherein
    the control circuit changes the threshold to a smaller value when the association circuit associates the first pixel with any of the entries in the palette, and the association circuit associates the second pixel with a specific entry in the palette when a difference between a pixel value of the second pixel and a palette value of the specific entry is smaller than the changed threshold, and does not associate the second pixel with the specific entry when the difference between the pixel value of the second pixel and the palette value of the specific entry is greater than the changed threshold.

4. The image encoding device according to claim 1, wherein
    the control circuit changes the threshold on the basis of a difference between a palette value of a first entry and a palette value of a second entry in the palette.

5. The image encoding device according to claim 1, wherein
    the condition of the target amount of information indicates an upper limit value for a bit rate in transmitting the encoding result.

6. The image encoding device according to claim 1, wherein
a difference between palette values of the two entries fused by the fusion circuit is a minimum value of differences between two palette values in the palette.

7. An image encoding method for encoding an image to be encoded by using a palette, the image encoding method comprising:
determining, by an image encoding device, whether a first pixel included in the image to be encoded will be associated with any entry in the palette, on the basis of a threshold for a difference between a pixel value of the first pixel and a palette value;
adding an entry for the first pixel to the palette by the image encoding device when the first pixel is not associated with any of the entries in the palette;
fusing two entries in the palette so as to generate a fused entry and adding an entry to the palette by the image encoding device when an encoding result of the image to be encoded does not satisfy a condition of a target amount of information by adding an entry to the palette;
changing the threshold by the image encoding device when the first pixel is associated with any of the entries in the palette, when the entry for the first pixel is added to the palette, or when the fused entry is generated and the entry for the first pixel is added to the palette;
determining, by the image encoding device, whether a second pixel included in the image to be encoded will be associated with any of the entries in the palette, on the basis of the changed threshold for a difference between a pixel value of the second pixel and a palette value; and
encoding, by the image encoding device, the image to be encoded by using the palette.

8. A non-transitory computer-readable recording medium having stored therein an image encoding program for causing a computer that encodes an image to be encoded by using a palette to execute a process comprising:
determining whether a first pixel included in the image to be encoded will be associated with any entry in the palette, on the basis of a threshold for a difference between a pixel value of the first pixel and a palette value;
adding an entry for the first pixel to the palette when the first pixel is not associated with any of the entries in the palette;
fusing two entries in the palette so as to generate a fused entry and adding an entry to the palette by the image encoding device when an encoding result of the image to be encoded does not satisfy a condition of a target amount of information by adding an entry to the palette;
changing the threshold when the first pixel is associated with any of the entries in the palette, when the entry for the first pixel is added to the palette, or when the fused entry is generated and the entry for the first pixel is added to the palette;
determining whether a second pixel included in the image to be encoded will be associated with any of the entries in the palette, on the basis of the changed threshold for a difference between a pixel value of the second pixel and a palette value; and
encoding the image to be encoded by using the palette.

9. An image encoding device that encodes an image to be encoded by using a palette, the image encoding device comprising:
a memory; and
a processor coupled to the memory and the processor configured to:
determine whether a first pixel included in the image to be encoded will be associated with any entry in the palette, on the basis of a threshold for a difference between a pixel value of the first pixel and a palette value;
add an entry for the first pixel to the palette when the association circuit does not associate the first pixel with any of the entries in the palette;
fuse two entries in the palette so as to generate a fused entry when an encoding result of the image to be encoded does not satisfy a condition of a target amount of information by adding an entry to the palette;
change the threshold when the association circuit associates the first pixel with any of the entries in the palette, when the addition circuit adds the entry for the first pixel to the palette, or when the fusion circuit generates the fused entry and the addition circuit adds the entry for the first pixel to the palette; and
encode the image to be encoded by using the palette, wherein
the processor determines whether a second pixel included in the image to be encoded will be associated with any of the entries in the palette, on the basis of the changed threshold for a difference between a pixel value of the second pixel and a palette value.

* * * * *